(12) United States Patent
Nishida

(10) Patent No.: US 11,455,857 B2
(45) Date of Patent: Sep. 27, 2022

(54) MONEY HANDLING APPARATUS, MONEY HANDLING SYSTEM, AND MONEY HANDLING METHOD

(71) Applicant: GLORY LTD., Himeji (JP)

(72) Inventor: Naoyuki Nishida, Himeji (JP)

(73) Assignee: GLORY LTD., Hyogo (JP)

( * ) Notice: Subject to any disclaimer, the term of this patent is extended or adjusted under 35 U.S.C. 154(b) by 290 days.

(21) Appl. No.: 16/836,058

(22) Filed: Mar. 31, 2020

(65) Prior Publication Data

US 2020/0327764 A1    Oct. 15, 2020

(30) Foreign Application Priority Data

Apr. 11, 2019  (JP) .............................. JP2019-075613

(51) Int. Cl.
*G06Q 40/00* (2012.01)
*G07D 11/235* (2019.01)
(Continued)

(52) U.S. Cl.
CPC ......... *G07D 11/235* (2019.01); *G06Q 20/206* (2013.01); *G06Q 40/12* (2013.12);
(Continued)

(58) Field of Classification Search
None
See application file for complete search history.

(56) References Cited

U.S. PATENT DOCUMENTS

| 11,315,379 B1 * | 4/2022 | Crandall ................ G07D 11/34 |
| 2015/0213425 A1 * | 7/2015 | Namura ................ G06Q 20/202 |
| | | 705/21 |

(Continued)

FOREIGN PATENT DOCUMENTS

| JP | 1992-11-27 B2 | 11/1992 |
| JP | 2960201 B2 | 11/1992 |

(Continued)

OTHER PUBLICATIONS

European Search Report for Application No. 20168435.4-1213 dated May 29, 2020.

*Primary Examiner* — Fateh M Obaid
(74) *Attorney, Agent, or Firm* — Renner, Kenner, Greive, Bobak, Taylor & Weber

(57) ABSTRACT

When a checkout apparatus 10 serving as a money handling apparatus detects that change is left behind after dispensing of the change in a settlement mode, the checkout apparatus 10 shifts from a settlement mode to a left money retaining mode. Upon receiving money in the left money retaining mode, the checkout apparatus 10 stores information on the amount of the money, date and time of the reception, etc., in a memory, thereby managing the left money separately from proceeds from sales. Since the same money handling unit as that for the settlement is used for storage and feeding of the left money, miniaturization and cost reduction of the apparatus is realized. Since money equivalent to the left money can be dispensed as in the settlement, a complicated operation, such as opening a housing of the checkout apparatus 10, is not necessary when responding to a request for a refund of the left money.

11 Claims, 11 Drawing Sheets

(51) Int. Cl.
*G07D 11/28* (2019.01)
*G07D 11/34* (2019.01)
*G07D 11/14* (2019.01)
*G06Q 20/20* (2012.01)
*G07D 9/02* (2006.01)

(52) U.S. Cl.
CPC ............ *G07D 11/14* (2019.01); *G07D 11/28* (2019.01); *G07D 11/34* (2019.01); *G07D 9/02* (2013.01); *G07D 2201/00* (2013.01); *G07D 2211/00* (2013.01)

(56) References Cited

U.S. PATENT DOCUMENTS

2017/0124813 A1* 5/2017 Misener ................... G07D 3/00
2018/0089923 A1* 3/2018 Hwang ................ G07G 1/0009
2019/0180550 A1* 6/2019 Nishida ................. G07D 11/60

FOREIGN PATENT DOCUMENTS

| | | |
|---|---|---|
| JP | 2004-094545 A | 3/2004 |
| JP | 2010-086158 A | 4/2010 |
| JP | 2012-018532 A | 1/2012 |

\* cited by examiner

FIG.1A
SETTLEMENT FOR COMMODITIES
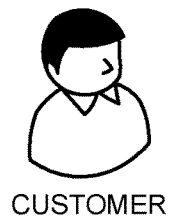
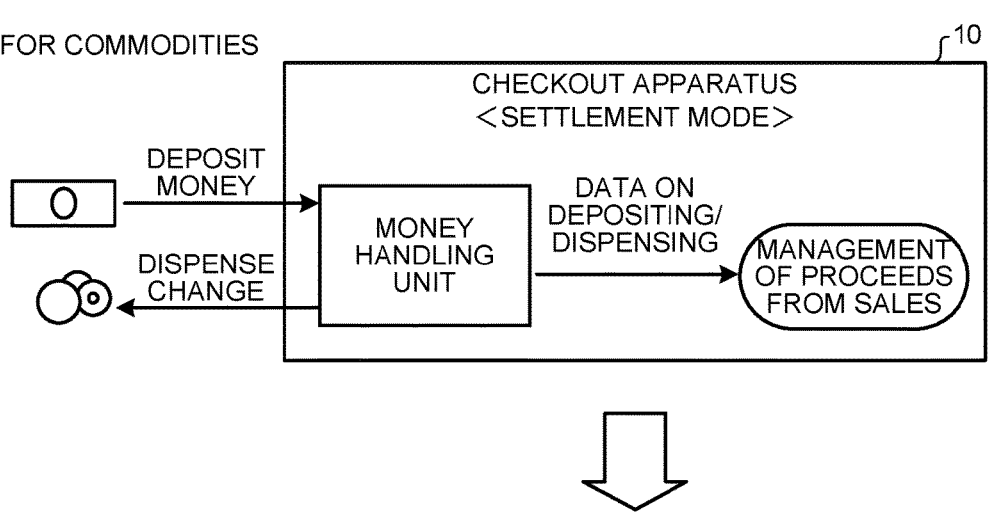
FIG.1B
CHANGE LEFT BEHIND
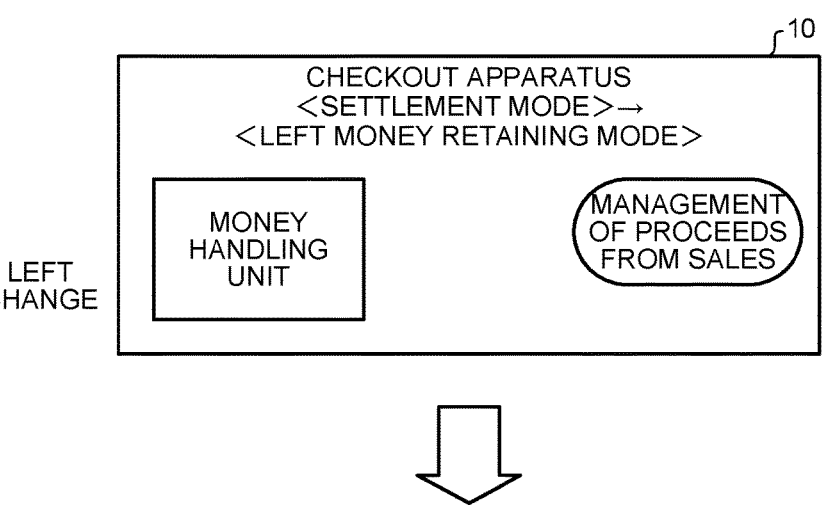
FIG.1C
RETAINMENT OF LEFT CHANGE
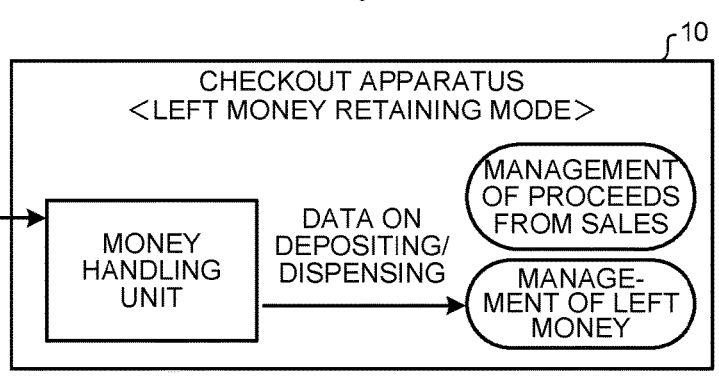

FIG.8

| THERE IS NO LEFT MONEY HAVING NOT BEEN REFUNDED | THERE IS LEFT MONEY HAVING NOT BEEN REFUNDED |
|---|---|
| COLLECT ALL MONEY | COLLECT ALL MONEY |
| COLLECT ONLY PROCEEDS | COLLECT ONLY PROCEEDS |
| LEAVE ALL MONEY | LEAVE ALL MONEY |
| | COLLECT ONLY LEFT MONEY |
| | SEQUENTIALLY COLLECT PROCEEDS AND LEFT MONEY HAVING NOT BEEN REFUNDED |

FIG.9A

COINS HAVE BEEN LEFT BEHIND.
PLEASE CHECK THE OUTLET.

FIG.9B

PLEASE CHECK THE AMOUNT OF LEFT MONEY,
AND DEPOSIT THE LEFT MONEY IN THE INLET.

FIG.9C

PLEASE CHECK THE AMOUNT OF MONEY,
AND PRESS "OK" IF THE AMOUNT IS CORRECT.

FIG.9D

●RECORDED INFORMATION

DATE AND TIME : 2018/09/26, 09:10

AMOUNT : 689 YEN

REGISTER No. : 13

TRANSACTION CONTENT : DEPOSITED AMOUNT 2,000 YEN, CHANGE 689 YEN

RECEIPT No. : 123456

FIG.10A

PLEASE SELECT AN ITEM YOU WANT TO EXAMINE.

1. 2018/09/25, 14:16, 124 YEN (REFUNDED)
2. 2018/09/26, 09:10, 689 YEN
3. 2018/09/26, 13:42, 435 YEN

FIG.10B

PLEASE PRESS "OK"
IF THE EXAMINED CONTENT HAS NO PROBLEMS.

● RECORDED INFORMATION

DATE AND TIME : 2018/09/26, 09:10

AMOUNT : 689 YEN

REGISTER No. : 13

TRANSACTION CONTENT : DEPOSITED AMOUNT 2,000 YEN,
CHANGE 689 YEN
⋮

FIG.10C

689 YEN WILL BE DISPENSED.
PLEASE RETURN THE MONEY TO THE CUSTOMER.

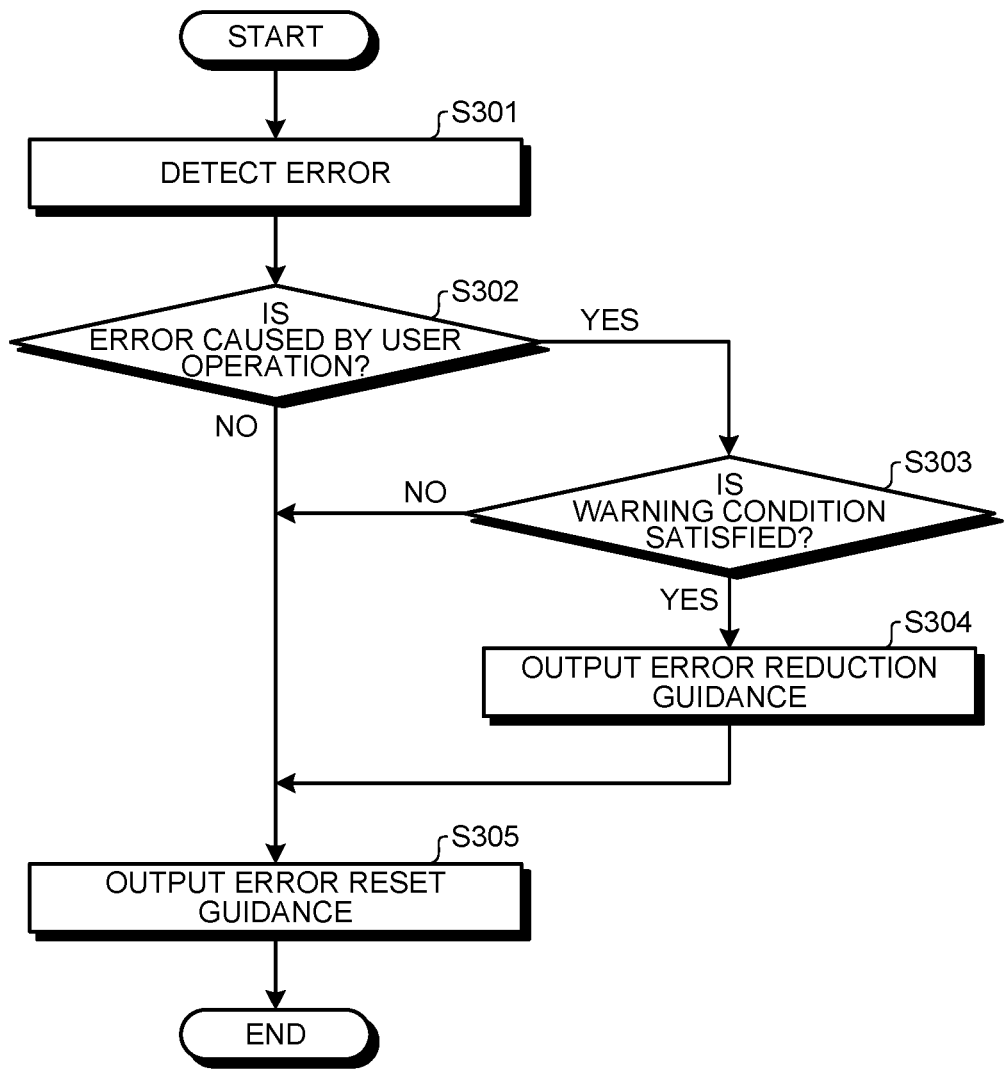

MONEY HANDLING APPARATUS, MONEY HANDLING SYSTEM, AND MONEY HANDLING METHOD

BACKGROUND OF THE INVENTION

Field of the Invention

The present invention relates to a money handling apparatus, a money handling system, and a money handling method which perform handling money.

Description of the Background Art

Conventionally, in a store such as a supermarket that sells commodities, a clerk operates a POS (Point Of Sales) register to perform registration of information of commodities to be purchased by a customer and checkout for the total price of the commodities. However, since the clerk performs both the registration and the checkout with the POS register, if the clerk takes time in checkout, the waiting time of the customer will be increased. In addition, there is a possibility that the clerk may perform or may be suspected of a dishonest act during checkout.

In view of the above problems, a technique called "semi-self-checkout", in which an apparatus for registration of commodities is separated from an apparatus for checkout and a clerk performs registration of commodities with the registration apparatus while a customer performs checkout with the checkout apparatus, has been known (see Japanese Laid-Open Patent Publication No. 2012-018532, for example). Meanwhile, a technique called "self-checkout", in which a customer performs both registration and checkout for commodities with a checkout apparatus for registration and checkout, has been known (see Japanese Laid-Open Patent Publication No. 2010-086158).

A checkout apparatus that deals with checkout with money in the self-checkout and the semi-self-checkout has a function of a money handling apparatus for depositing and dispensing money being cash including banknotes and/or coins. Specifically, when money exceeding the total price of commodities to be purchased is deposited in the checkout apparatus, the checkout apparatus dispenses money as change according to need. In this regard, the customer may forget to take the money dispensed as the change. Regarding such money left behind, Japanese Patent No. 2960201 discloses a coin handling apparatus including a mechanism for collecting foreign objects and coins that are left behind, and sorting and storing the objects and the coins into a foreign object collection unit and a left coin collection unit.

SUMMARY OF THE INVENTION

In the conventional art, however, cash including banknotes and/or coins (hereinafter referred to as money) that is left behind (hereinafter also referred to simply as "left money") cannot be efficiently handled. The reason is as follows. Although the left money itself can be stored in the apparatus, management as to when and how much money has been left behind is performed by the clerk. Specifically, it is a heavy burden for the clerk to respond to a customer who requests a refund of money he/she has left behind, and judge whether or not the customer's request is valid and/or how much money should be refunded to the customer. Such a burden hinders efficient handling.

In the conventional art, when refunding the left money, the clerk has to perform a complicated operation including: unlocking a money handling apparatus to open a door, pulling out a storage unit used for left money, counting the amount of money to be refunded, and taking out the money. Furthermore, the structure in which left money is stored in the money handling apparatus causes increase in size and cost of the money handling apparatus.

Therefore, it is an important issue to improve efficiently in handling money that is left behind, reduce the burden on a clerk, and realize miniaturization and cost reduction of a money handling apparatus.

The present invention is made to solve the problems of the conventional art, and an object of the present invention is to improve efficiency in handling money that is left behind in a money handling apparatus.

In order to solve the above-described problems and achieve the object, a money handling apparatus according to an aspect of the present invention includes: a memory configured to store left money management data; a controller configured to control the money handling apparatus; a depositing unit configured to receive money; and a dispensing unit configured to dispense money. The controller is able to set an operation mode of the money handling apparatus to a left money retaining mode. When the money handling apparatus is in the left money retaining mode, the controller stores, in the memory, information indicating an amount of money received through the depositing unit and information indicating date and time when the money was received through the depositing unit, as the left money management data.

A money handling system according to an aspect of the claimed invention includes: a memory configured to store left money management data; a controller configured to control the money handling apparatus; a depositing unit configured to receive money; and a dispensing unit configured to dispense money. The controller is able to set an operation mode of the money handling apparatus to a left money retaining mode. When the money handling apparatus is in the left money retaining mode, the controller stores, in the memory, information indicating an amount of money received through the depositing unit and information indicating date and time when the money was received through the depositing unit, as the left money management data.

A money handling method of a money handling apparatus according to an aspect of the claimed invention includes: a memory configured to store left money management data; a controller configured to control the money handling apparatus; a depositing unit configured to receive money; and a dispensing unit configured to dispense money. The controller is able to set an operation mode of the money handling apparatus to a left money retaining mode. The method including: receiving money through the depositing unit when the money handling apparatus is in the left money retaining mode; and storing, in the memory, information indicating an amount of the received money and information indicating date and time when the money was received through the depositing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A, 1B and 1C illustrate the concept of a money handling apparatus according to an embodiment of the present invention;

FIG. 8 is a drawing for explaining collection of money from the change machine;

FIGS. 9A, 9B, 9C, and 9D show a specific example of display output when coins are left behind;

FIGS. 10A, 10B, and 10C show a specific example of display output related to a refund of left money; and FIG. 11 is a flowchart showing a procedure of handling when an error occurs.

DESCRIPTION OF THE PREFERRED EMBODIMENTS

Figure 2:
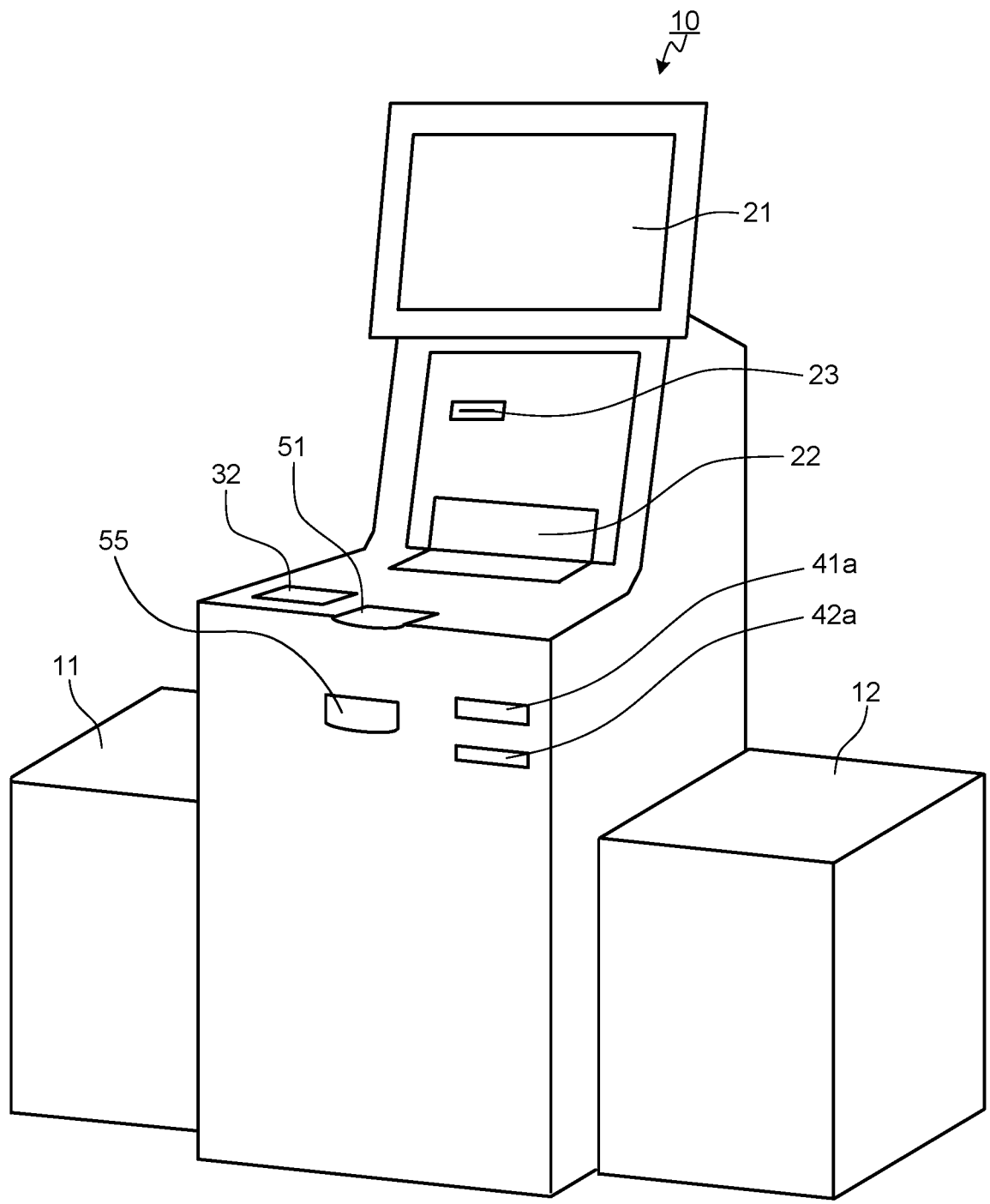
FIG. 2 is a perspective view showing an external structure of a checkout apparatus.

Hereinafter, a money handling apparatus, a money handling system, and a money handling method according to an embodiment of the present invention will be described with reference to the accompanying drawings. In this embodiment, the present invention is applied to a cash settlement apparatus (hereinafter referred to as a checkout apparatus) installed in a store such as a convenience store or a supermarket.

<Concept of Checkout Apparatus According to the Present Embodiment>

FIGS. 1A to 1C illustrate the concept of a checkout apparatus 10 according to the present embodiment. The checkout apparatus 10 is used for self-checkout in which a customer performs registration of information of commodities to purchase, and checkout (i.e. settlement) for the total price of the commodities. Although described later in detail, the checkout apparatus 10 includes a POS register 20 and a change machine 30. The POS register 20 is a registration apparatus that allows a customer to perform registration of information of commodities to purchase. The change machine 30 allows the customer to pay for the total price of the commodities. The change machine 30 includes a money handling unit that allows the customer to deposit and dispense money being cash for purchasing the commodities. The checkout apparatus 10 including the POS register 20 and the change machine 30 is used as the money handling apparatus. Note that the change machine 30 may be used as the money handling apparatus.

The checkout apparatus 10 is configured to operate in either a settlement mode or a left money retaining mode, which is selected as an operation mode. The settlement mode is, so to say, a normal operation mode in which the checkout apparatus 10 performs registration of information of commodities to be purchased, and checkout for the total price of the commodities. The left money retaining mode is an operation mode in which the checkout apparatus 10 stores money that is left behind.

As shown in FIG. 1A, the customer operates the checkout apparatus 10 in which the settlement mode is selected, to perform registration of information of commodities to purchase, and deposits (e.g. feeds) money including banknotes and/or coins from a money inlet (described later) into the checkout apparatus 10 to pay for the total price of the commodities. The deposited money is stored in the money handling unit. The checkout apparatus 10 calculates a difference between the amount of the money deposited from the money inlet and the total price of the commodities, and dispenses (e.g. feeds out) money as change from the money handling unit. Data on the depositing or dispensing of money in the settlement mode is used for managing proceeds from sales in the store.

Although the checkout apparatus 10 has dispensed the change from a money outlet (described later), if the customer forgets to take the change from the money outlet, a left money detector (described later) disposed at the money outlet of the checkout apparatus 10 detects the change left at the money outlet as left money. Then, the operation mode of the checkout apparatus 10 is shifted from the settlement mode to the left money retaining mode as shown in FIG. 1B. The checkout apparatus 10 is capable of determining whether money as change dispensed from the money handling unit remains at the money outlet or not, based on a condition that "the state of the remaining of the dispensed money has been continuing during a predetermined time", for example. The checkout apparatus 10 performs the detection of the left money by the determination of the checkout apparatus 10.

As shown in FIG. 1C, when a clerk deposits money, which is the money as change left behind in the money outlet, into the checkout apparatus 10 in the left money retaining mode, the deposited money is stored in the money handling unit. Data on the depositing in the left money retaining mode is not used for managing the proceeds from sales in the store but is used for managing the left money. Specifically, when the depositing is performed in the left money retaining mode, the checkout apparatus 10 associates the amount of money deposited from the money inlet with the time (date and time) of the depositing, etc., and stores these pieces of information in a predetermined memory as information of left money.

Although described later in detail, in the left money retaining mode, the left change can be refunded to the customer by dispensing money equivalent to the amount of change left behind in the money handling unit, from the money outlet. Data of this dispensing is also not used for managing the proceeds from sales but is used for managing the left money.

As described above, the checkout apparatus 10 functioning as the money handling apparatus can operate in the left money retaining mode. When the operation mode of the checkout apparatus 10 is shifted from the settlement mode to the left money retaining mode, the checkout apparatus 10 stores, in the memory, information on the amount of money deposited from the inlet and the time of the depositing, and thereby, the checkout apparatus 10 is capable of managing the money left behind in the money outlet.

Since the money handling unit used for storage and feeding of the left money is also used for the settlement, miniaturization and cost reduction of the apparatus can be achieved. In addition, since money equivalent to the left money can be dispensed in a similar manner to the settlement, a complicated operation, such as opening the housing of the checkout apparatus 10, is not necessary when the clerk responds to a request for a refund of left money.

<Structure of checkout apparatus 10>

The checkout apparatus 10 at least includes a money inlet for depositing money, a money outlet for disposing money and a display/operation unit for selecting the operation mode. FIG. 2 is a perspective view showing the external structure of the checkout apparatus 10. As shown in FIG. 2, the checkout apparatus 10 includes a display/operation unit 21 of the POS register 20, and a display/operation unit 32, a banknote inlet 41a, a banknote outlet 42a, a coin inlet 51, and a coin outlet 55 of the change machine 30. The display/operation unit corresponds to the display/operation unit 21 and display/operation unit 32. The aforementioned money inlet corresponds to the banknote inlet 41a and the coin inlet 51. The money inlet is a depositing unit. The aforementioned money outlet corresponds to the banknote outlet 42a and the coin outlet 55. The money outlet is a dispensing unit. The checkout apparatus 10 further may include a barcode reader 22, and a card reader 23.

The checkout apparatus 10 is provided with commodity tables 11 and 12. Among commodities to be purchased, commodities not yet registered by the POS register 20 as the registration apparatus, i.e., commodities whose information is not yet registered, are placed on one of the commodity tables 11 and 12, while commodities having been registered by the POS register 20 are placed on the other table. For example, when the commodity table 11 is used for the unregistered commodities while the commodity table 12 is used for the registered commodities, an illustration of a shopping basket is drawn on the commodity table 11 while an illustration of a plastic bag is drawn on the commodity table 12.

A customer places a shopping basket, in which commodities to purchase are put, on the commodity table 11. The customer takes out each commodity, registers information of the commodity with the barcode reader 22 of the POS register 20, and puts the commodity on the commodity table 12. The customer repeats this operation. The barcode reader 22 reads a barcode attached to each commodity to acquire information such as the name and price of the commodity. The checkout apparatus 10 performs registration of the information of each commodity to be purchased by using the information acquired from the barcode.

The display/operation unit 21 of the POS register 20 is a liquid crystal touch panel display or the like. The display/operation unit 21 displays an operation guidance and information of registered commodities, and receives inputs of various operations. The card reader 23 is used for checkout using a payment card such as a credit card, a debit card, or a prepaid card.

The banknote inlet 41a and the coin inlet 51, as the money inlet, are used for depositing of banknotes and coins, respectively. The banknote outlet 42a and the coin outlet 55, as the money outlet, are used for dispensing of banknotes and coins, respectively. For example, after registering the commodities, the customer checks the total price displayed on the display/operation unit 21, and money as payment for the commodities is deposited from the banknote inlet 41a and/or the coin inlet 51 into the checkout apparatus 10 to deposit the money. When dispensing of change is needed, the checkout apparatus 10 discharges money as the change from the banknote outlet 42a and/or the coin outlet 55.

The display/operation unit 32 of the change machine 30 is a liquid crystal touch panel display or the like. The display/operation unit 32 performs display related to the change machine 30, such as display of an inventory amount of money, for each denomination, stored in the change machine 30, and display of a detected failure, and also receives operations related to the change machine 30.

Figure 3:
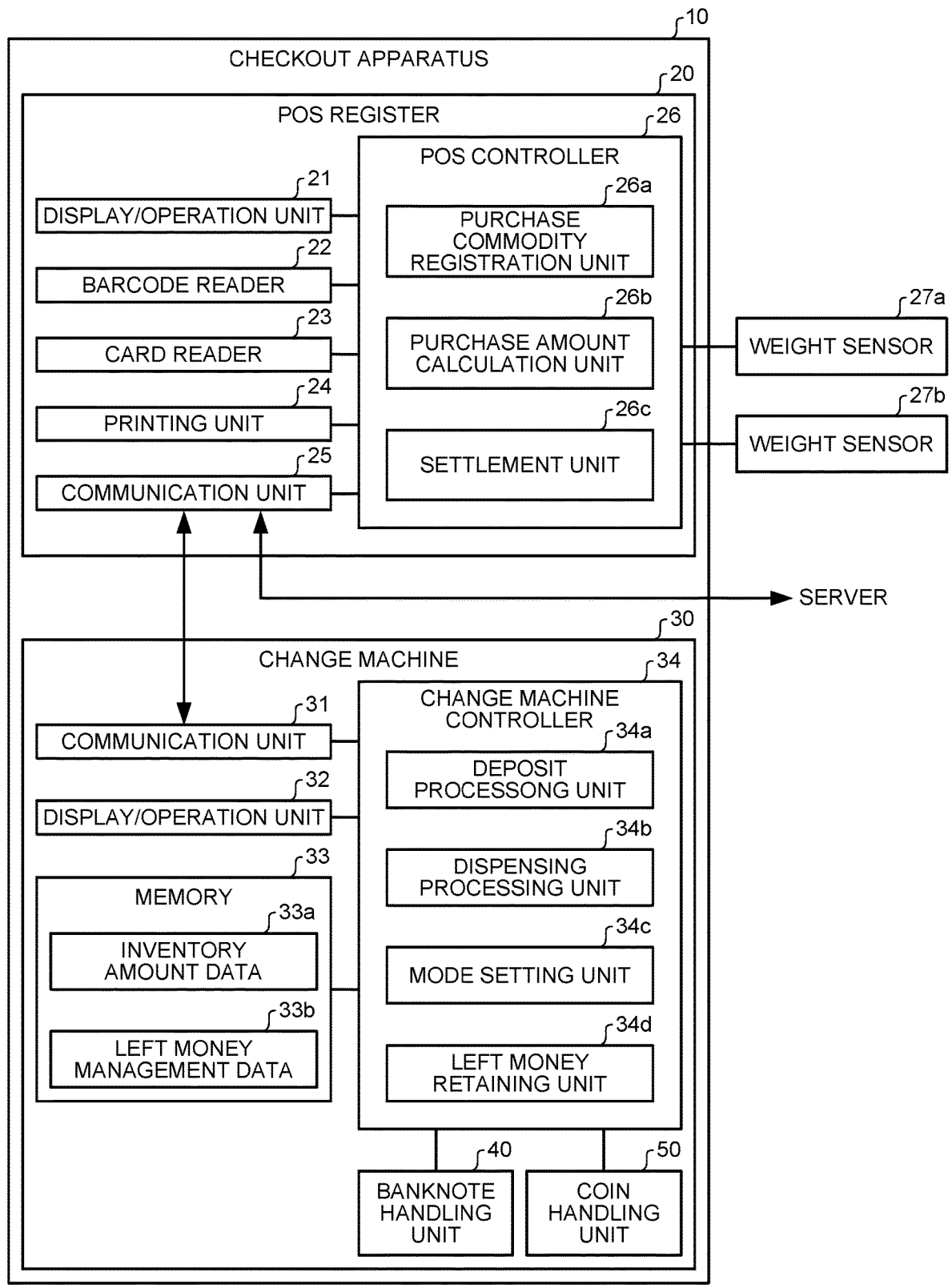
FIG. 3 is a functional block diagram showing a functional structure of the checkout apparatus.

FIG. 3 is a functional block diagram showing a functional structure of the checkout apparatus 10. The checkout apparatus 10 at least includes a controller and a memory 33. The controller may include the POS controller 26 and the change machine controller 34 as shown in FIG. 3. As shown in FIG. 3, the checkout apparatus 10 further includes the POS register 20 performing registration of commodity information, and the change machine 30 performing depositing or dispensing of money.

The POS register 20 at least includes a communication unit 25, a POS controller 26 and the display/operation unit 21. The POS register 20 further may include a printing unit 24, the barcode reader 22 and the card reader 23 described above. The printing unit 24 is used for issuing a receipt on which the content of transaction is printed. The content of transaction printed on the receipt includes, for example, the date and time, names and prices of registered commodities, the amount of deposited money, and the amount of change. The communication unit 25 is a communication interface for communication with the change machine 30 and an external server.

The POS controller 26 controls the POS register 20 that is the registration apparatus. The POS controller 26 includes a purchase commodity registration unit 26a, a purchase amount calculation unit 26b, and a settlement unit 26c. The POS controller 26 acquires weight measurement results from a weight sensor 27a and a weight sensor 27b disposed at the commodity table 11 and the commodity table 12, respectively. In the present embodiment, the weight sensor 27a is disposed at the commodity table 11 used for placing unregistered commodities, while the weight sensor 27b is disposed at the commodity table 12 used for placing registered commodities.

The purchase commodity registration unit 26a performs registration of commodities to be purchased. Specifically, when the barcode reader 22 reads a barcode attached to a commodity to acquire information such as the name and price of the commodity, the purchase commodity registration unit 26a registers the commodity by using the acquired information, and displays information of the registered commodity on the display/operation unit 21.

The purchase commodity registration unit 26a determines whether or not the registered commodity is placed on the commodity table 12, based on the measurement results of the weight sensor 27a and the weight sensor 27b. When the registered commodity is placed on the commodity table 12, the purchase commodity registration unit 26a becomes able to register a next commodity.

A decrease in the measurement result of the weight sensor 27a, which occurs before registering a commodity, corresponds to the weight of the commodity. Therefore, when the measurement result of the weight sensor 27b increases by the weight of the commodity, it is determined that "the registered commodity is placed on the commodity table 12", and then registration of a next commodity is allowed.

When a commodity finally registered is placed on the commodity table 12 and the weight of the shopping basket becomes equal to the initial measurement result that has been obtained by the weight sensor 27a, the purchase commodity registration unit 26a ends commodity registration.

When the purchase commodity registration unit 26a has ended commodity registration, the purchase amount calculation unit 26b sums up the prices of all the registered commodities to calculate a purchase amount (monetary amount), and displays the purchase amount on the display/operation unit 21.

The settlement unit 26c settles the purchase amount calculated by the purchase amount calculation unit 26b to end the transaction, and issues a receipt. The purchase amount may be settled by using a payment card or money (cash).

Specifically, when settlement with a payment card is selected, the settlement unit 26c acquires information such as card ID from the payment card inserted in the card reader 23, and transmits the acquired information together with the purchase amount to an external server, thereby performing the settlement.

When settlement with money is selected, the settlement unit 26c transmits the purchase amount to the change machine 30, and completes the settlement upon receiving a checkout completion notification from the change machine 30.

The change machine 30 at least includes a money handling unit and a memory 33. The money handling unit may include a banknote handling unit 40 and a coin handling unit 50. The change machine 30 further may include the display/operation unit 32 described above. The change machine 30 further may include a communication unit 31 and a change machine controller 34. The communication unit 31 is a communication interface for communication with the POS register 20.

The memory 33 stores inventory amount data 33a and left money management data 33b. The memory 33 is, for example, a memory device implemented by, for example, a nonvolatile memory such as a flash memory, or a secondary storage medium such as a hard disk drive.

The inventory amount data 33a is data indicating the inventory amount, for each denomination, of money stored in the money handling unit. The left money management data 33b is data in which, in case that a customer has forgotten to take change from the money outlet, the amount of money deposited from the money inlet by the customer is associated with the time (date and time) at which the money was deposited. The left money management data 33b may further include information for specifying the customer who deposited the money for the transaction, information as to whether the left money has already been refunded, etc., in association with each other.

The banknote handling unit 40 stores banknotes for each denomination, and the coin handling unit 50 stores coins for each denomination. The banknote handling unit 40 and the coin handling unit 50 correspond to the money handling unit shown in FIG. 1. The banknote handling unit 40 and the coin handling unit 50 will be described later in detail.

The change machine controller 34 controls the change machine 30, and includes a left money retaining unit 34d. The change machine controller 34 further includes a mode setting unit 34c. The change machine controller 34 further includes a deposit processing unit 34a and a dispensing processing unit 34b.

The deposit processing unit 34a performs depositing of money. Upon being notified by the checkout apparatus 10 of the purchase amount, the deposit processing unit 34a allows deposit of money into the banknote handling unit 40 and the coin handling unit 50.

Thereafter, the deposit processing unit 34a acquires the number of pieces of money including banknotes and coins, for each denomination, deposited from the banknote handling unit 40 and the coin handling unit 50, respectively, and calculates the total amount of the deposited money. When the total amount of the deposited money exceeds the purchase amount, the deposit processing unit 34a calculates, as change, a difference between the total amount and the purchase amount, and instructs the dispensing processing unit 34b to dispense the change.

When the total amount of the deposited money matches the purchase amount or when dispensing of the change by the dispensing processing unit 34b has normally ended, the deposit processing unit 34a transmits a checkout completion notification to the POS register 20.

The dispensing processing unit 34b performs dispensing of money. Specifically, upon receiving a change dispensing instruction from the deposit processing unit 34a, the dispensing processing unit 34b determines the denomination and number of money to be dispensed, according to the amount of the change, and outputs a dispensing instruction to the banknote handling unit 40 and the coin handling unit 50, thereby performing dispensing. When dispensing of the change has normally ended, the dispensing processing unit 34b notifies the deposit processing unit 34a of this fact.

The mode setting unit 34c is a processing unit for changing the operation mode of the change machine 30. The operation mode of the change machine 30 includes the settlement mode and the left money retaining mode. In this embodiment, the operation mode of the change machine 30 corresponds to the operation mode of the entire checkout apparatus 10.

The settlement mode is, so to say, a normal operation mode to perform registration of commodity information and checkout. The left money retaining mode is an operation mode to store left money. When change being left behind is detected during the operation in the settlement mode, the mode setting unit 34c notifies the clerk of this fact, and selects the left money retaining mode upon receiving an operation performed by the clerk. Thus, the operation mode of the change machine 30 is shifted from the settlement mode to the left money retaining mode. Likewise, the change machine 30 ends the operation in the left money retaining mode in response to an operation performed by the clerk, and thus the operation mode thereof is shifted from the left money retaining mode to the settlement mode. In order to deal with a refund of change, the change machine 30 can enter the left money retaining mode in response to an operation performed by the clerk even when change being left behind is not detected.

Detection of left money is performed by the left money detector disposed at the money outlet of the checkout apparatus 10. The left money detector includes detection units 42b, 55a described later. More specifically, the left money detector is implemented by an optical sensor for detecting, with detection light, that money as an object to be detected remains in the money outlet. Using the left money detector, the checkout apparatus 10 is capable of determining whether or not money is left behind, based on a condition that "the state of the remaining of the dispensed money has been continuing during a predetermined time", for example. Regarding the operation performed by the clerk, this operation should be received after the operator has been authenticated to be a clerk having predetermined authority through, for example, reading the ID card of the clerk.

The operation mode can be changed as appropriate without being limited to the above examples. For example, when left change is detected, the operation mode may be shifted from the settlement mode to the left money retaining mode without an operation of the clerk. Alternatively, when the left change is detected, notification is made to the clerk and the operation mode is shifted from the settlement mode to a suspension mode to inhibit settlement by other customers, and thereafter, the operation mode is shifted from the suspension mode to the left money retaining mode upon receiving an operation performed by the clerk.

Notification to the clerk may be made in any way. Notification may be made through communication of the communication unit 31 with a terminal device for the clerk, or may be made by lighting a lamp for notification. That is, the communication unit 31 or the lamp for notification serves as a notification unit that notifies the clerk of left change.

The left money retaining unit 34d manages depositing or dispensing of money in the left money retaining mode. The left money retaining unit 34d allows deposit of money into the banknote handling unit 40 and the coin handling unit 50 in the left money retaining mode. Thereafter, the left money retaining unit 34d acquires the number of money, for each denomination, deposited from the banknote handling unit 40 and the coin handling unit 50, and calculates the total amount of the deposited money.

The left money retaining unit 34d associates the total amount of the money deposited from the inlet with the time (date and time) at which the money was deposited, and registers the associated information in the memory 33 as left money management data 33b. The memory 33 stores the associated information therein. The left money retaining unit 34d may further associate, with the total amount and the time, information specifying the customer, register No., transaction content such as the amount of deposited money and change at settlement, receipt No., clerk ID identifying the clerk, etc., and may register the associated information in the memory 33 as left money management data 33b. The memory 33 stores the associated information therein.

Information specifying the customer who deposited money from the inlet indicates that a monetary amount equivalent to the received money should be refunded to this customer. The information specifying the customer may be a card ID of a point card, for example. Since the card ID of the point card can be read by the card reader 23, the card reader 23 serves as an information reader for reading the information specifying the customer. Association of the information specifying the customer may be performed when satisfying a condition that the amount of money dispensed as change matches the amount of money deposited in the left money retaining mode.

The left money retaining unit 34d can control the display unit (display/operation unit 32 or display/operation unit 21) to display the amount of money, the date and time registered in the left money management data 33b, in association with each other. Then, based on an operation performed by the clerk who is the operator having predetermined authority, the left money retaining unit 34d can control the money handling unit (banknote handling unit 40 and coin handling unit 50) to perform a refund for the money received during the left money retaining mode.

When a refund has been made, the left money retaining unit 34d updates the left money management data 33b while associating the data 33b with a flag indicating "already refunded". The data 33b associated with the flag indicating "already refunded" can be displayed but will not be used for dispensing money so as to prevent the refund from being repeatedly performed based on the same data.

As described above, the amount of money deposited during the left money retaining mode and the date and time at which the money was deposited, are registered in the memory 33 as the left money management data 33b, so that these can be managed in a distinguishable manner from the amount of money deposited during a time period other than the left money retaining mode and the date and time at which the money was deposited. In addition, when performing a process such as management of proceeds from sales based on purchased amounts, the amount of money deposited during the left money retaining mode can be excluded from the objects to be processed.

Figure 4:
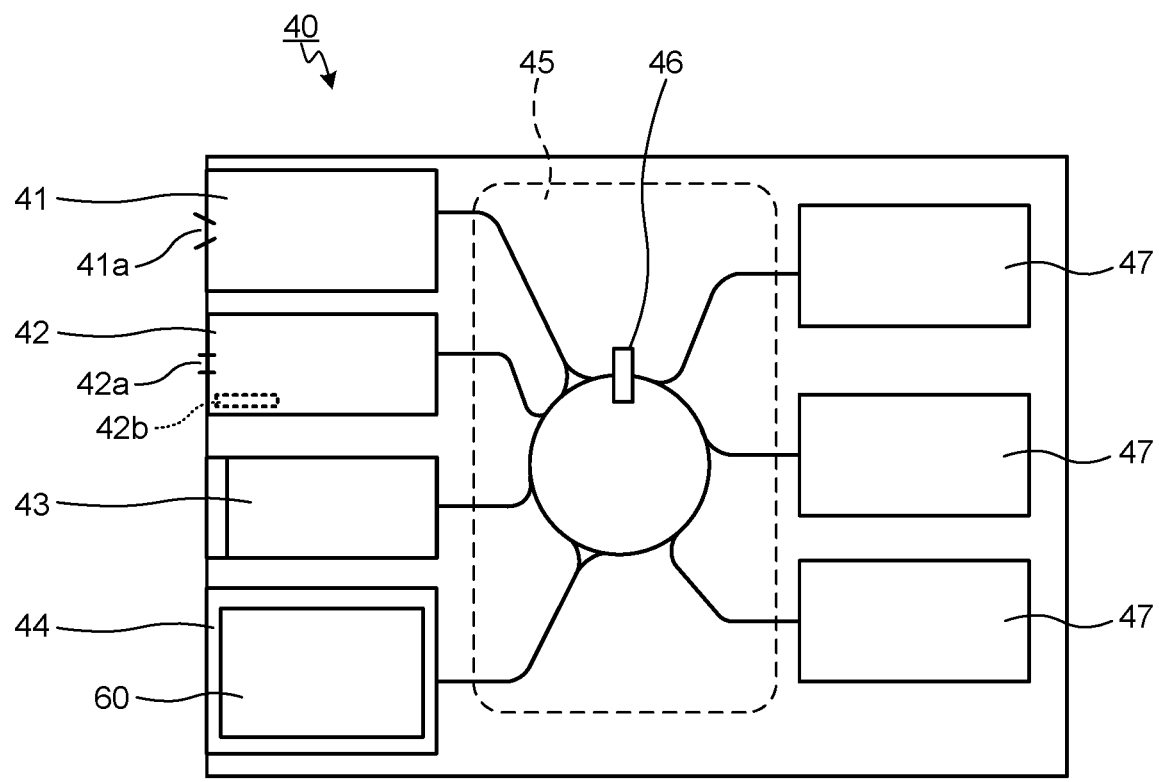
FIG. 4 is a schematic diagram showing a structure of a banknote handling unit.

Next, the banknote handling unit 40 and the coin handling unit 50 will be described in detail. FIG. 4 schematically shows the structure of the banknote handling unit 40. As shown in FIG. 4, the banknote handling unit 40 includes a banknote depositing unit 41, a banknote dispensing unit 42, a dispensing reject unit 43, a cassette mounting unit 44, a rotary transport unit 45, a banknote recognition unit 46, and banknote storage units 47 by denominations.

The banknote depositing unit 41 receives banknotes deposited from a banknote inlet 41a, and feeds the received banknotes one by one to the rotary transport unit 45. Meanwhile, the banknote dispensing unit 42 temporarily stores the banknotes transported one by one from the rotary transport unit 45. When all banknotes to be dispensed are stored therein, the banknote dispensing unit 42 discharges the banknotes from a banknote outlet 42a to dispense the banknotes.

The banknote dispensing unit 42 is provided with a detection unit 42b which detects that there are dispensed banknotes remaining in the banknote dispensing unit 42 after a predetermined time has passed.

The dispensing reject unit 43 accumulates banknotes that are not suitable to be dispensed, such as a banknote whose denomination cannot be recognized. For example, among the banknotes fed out from the banknote storage unit 47 in dispensing, a banknote that could not be recognized by the banknote recognition unit 46 because of abnormal transport such as overlapping or skew, is transported to the dispensing reject unit 43. Meanwhile, among the banknotes taken into the machine from the banknote depositing unit 41, a banknote that could not be recognized by the banknote recognition unit 46 because of stain or the like in depositing, is returned to the banknote dispensing unit 42 as a rejected banknote in depositing.

A storage cassette 60, which is used for collection of proceeds from sales and replenishment of banknotes used as change, is detachably mounted to the cassette mounting unit 44.

A plurality of banknote storage units 47 are assigned corresponding denominations. Each banknote storage unit 47 can store banknotes of the assigned denomination, and feed out the stored banknotes one by one.

The rotary transport unit 45 has a rotary transport path in the center. A connection transport path is disposed between the rotary transport path and each of the banknote depositing unit 41, the banknote dispensing unit 42, the dispensing reject unit 43, the cassette mounting unit 44, and the plurality of banknote storage units 47. The banknote recognition unit 46, which recognizes the denomination, authenticity, fitness, face/back, transport state, etc., of each banknote, is disposed on the rotary transport path.

The rotary transport unit 45 drives the rotary transport path to rotate in both the clockwise direction and the counterclockwise direction in FIG. 4, thereby transporting the banknotes one by one. Specifically, when storing the banknotes in the banknote storage unit 47, the rotary transport path is driven to rotate clockwise in FIG. 4. When feeding out the banknotes from the banknote storage unit 47, the rotary transport path is driven to rotate counterclockwise in FIG. 4. In addition to the rotation drive control, the rotary transport unit 45 controls the destination of the banknotes by switching the banknote transport routes between the rotary transport path and the respective connection transport paths.

Figure 5:
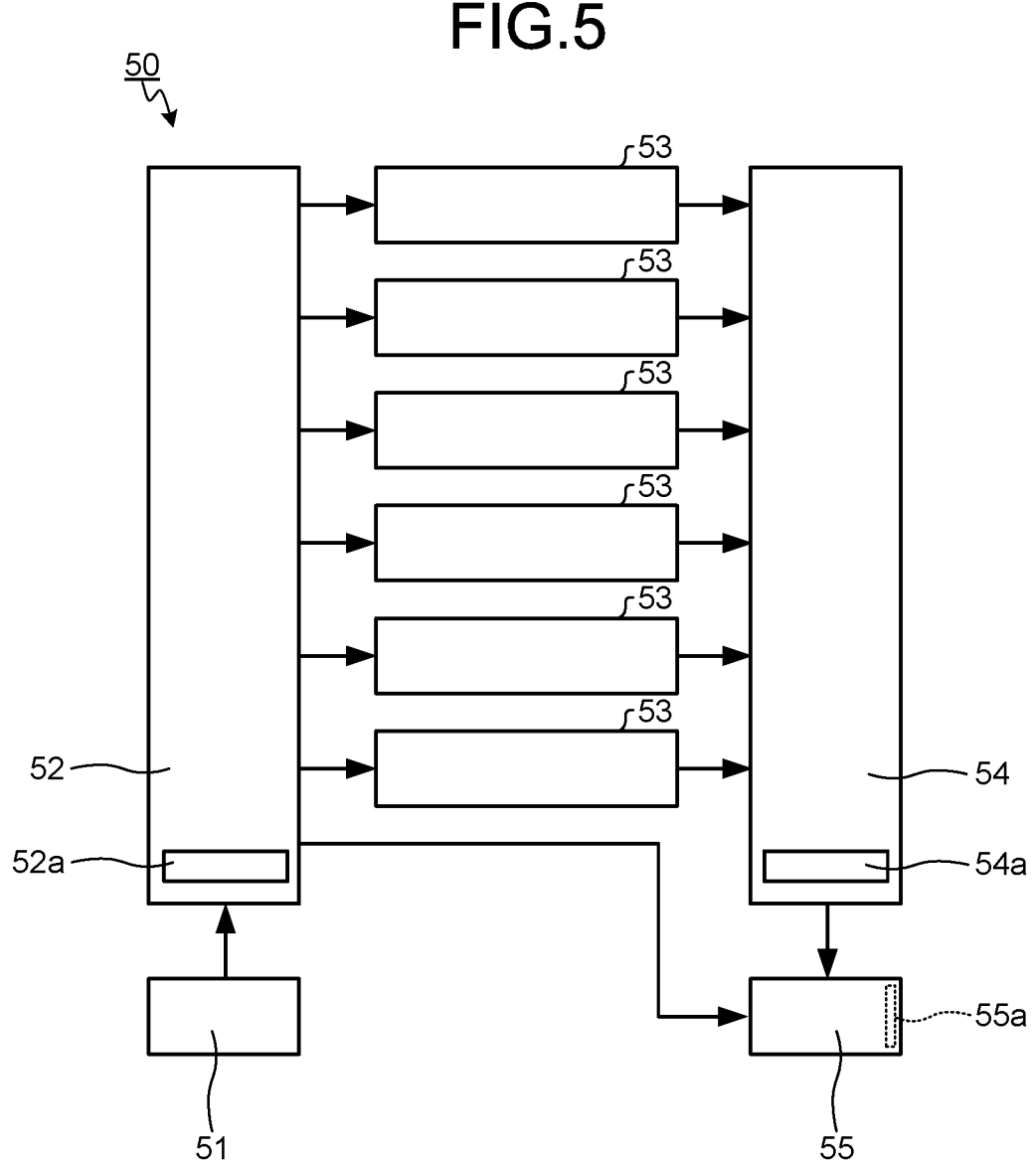
FIG. 5 is a schematic diagram showing a structure of a coin handling unit.

FIG. 5 schematically shows the structure of the coin handling unit 50. As shown in FIG. 5, the coin handling unit 50 includes a coin inlet 51, a deposited coin transport unit 52, coin storage units 53 by denominations, a dispensed coin transport unit 54, and a coin outlet 55. The deposited coin transport unit 52 is provided with a deposited coin recognition unit 52a, and the dispensed coin transport unit 54 is provided with a dispensed coin recognition unit 54a.

The deposited coin transport unit 52 takes coins deposited in the coin inlet 51, one by one, into a housing of the coin handling unit 50 such that the coins are arranged in one layer in one line. Specifically, the deposited coin transport unit 52 is provided with a coin feeding mechanism including a feed belt, etc. When deposit of coins in the coin inlet 51 is detected, the coin feeding mechanism is driven, whereby the coins are fed out one by one.

The deposited coin recognition unit 52a recognizes the denomination, authenticity, fitness, face/back, transport state, etc., of each coin fed out into the deposited coin transport unit 52. The deposited coin transport unit 52 determines a destination of each coin, based on the recognition result of the deposited coin recognition unit 52a. A coin not suitable to be stored in the coin storage unit 53, such as a stained coin or a coin not recognized as a genuine coin, is transported to the coin outlet 55 as a rejected coin. A coin suitable to be stored in the coin storage unit 53 is transported to the coin storage unit 53 corresponding to the recognition result of the denomination.

The plurality of coin storage units 53 are assigned corresponding denominations. Each coin storage unit 53 can store coins of the assigned denomination, and feed out the stored coins one by one to the dispensed coin transport unit 54.

The dispensed coin transport unit 54 transports the coins fed out from the coin storage unit 53, and dispenses the coins to the coin outlet 55. The dispensed coin recognition unit 54a is disposed upstream of the coin outlet 55, and recognizes the denomination of each coin to be dispensed to the coin outlet 55.

The coin outlet 55 is provided with a detection unit 55a which detects that there are dispensed coins remaining in the coin outlet 55 after a predetermined time has passed.

Figure 6:
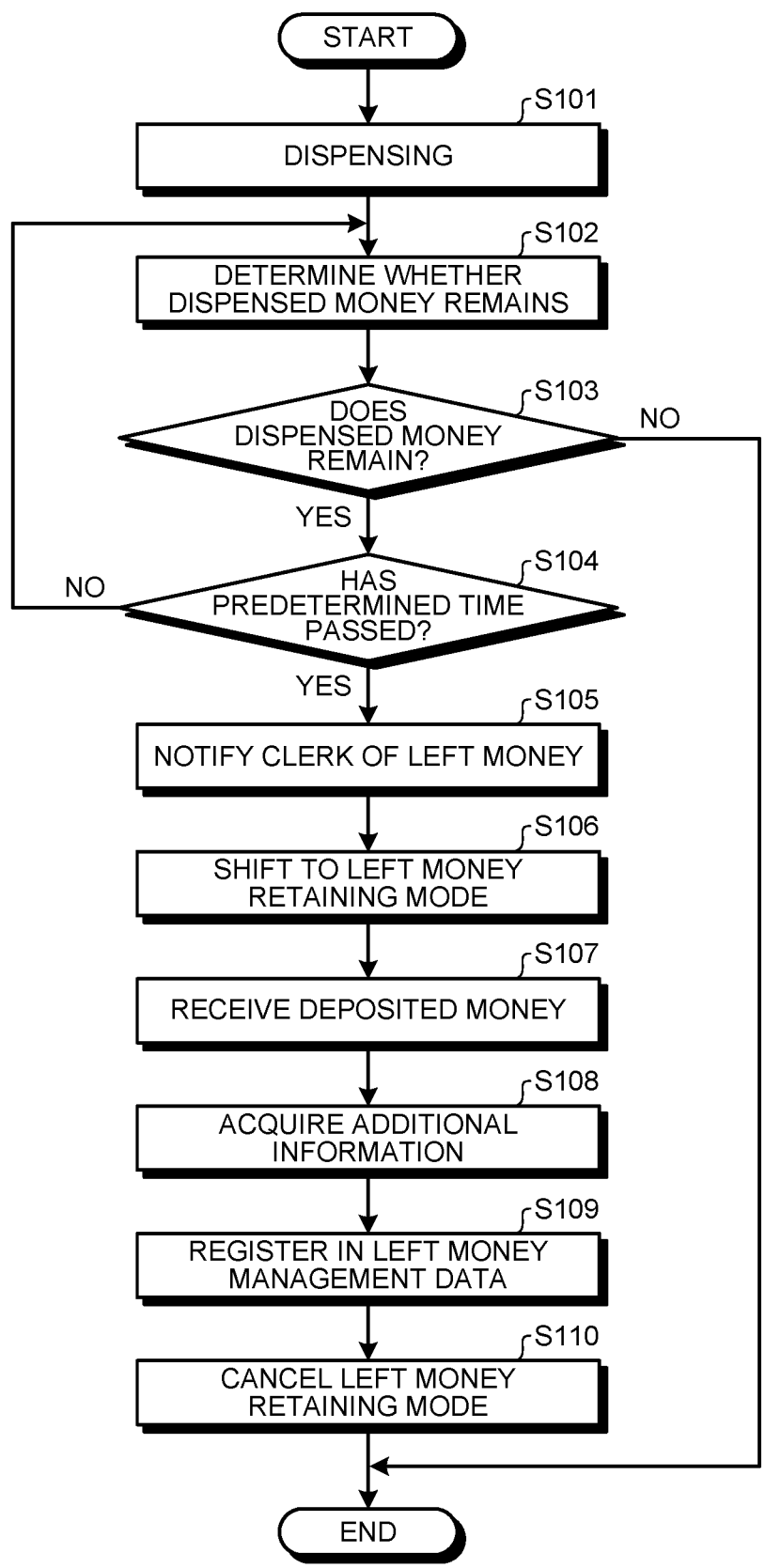
FIG. 6 is a flowchart showing a procedure of dispensing change in a change machine.

Next, dispensing of change in the change machine 30 will be described. FIG. 6 is a flowchart showing the procedure of dispensing change in the change machine 30. First, when the deposit processing unit 34a of the change machine 30 receives deposited money exceeding the purchase amount notified by the checkout apparatus 10, the dispensing processing unit 34b dispenses, as change, money equivalent to a difference between the total amount of the deposited money and the purchase amount (step S101).

Thereafter, the mode setting unit 34c determines whether or not the dispensed money remains, based on the detection results of the detection unit 42b and the detection unit 55a (step S102). When the dispensed money does not remain (No in step S103), the process is ended.

When the dispensed money remains (Yes in step S103), the mode setting unit 34c determines whether or not a predetermined time has passed from the dispensing (step S104). When the predetermined time has not passed yet (No in S104), the process goes to step S102.

When the predetermined time has passed with the dispensed money remaining (Yes in step S104), the mode setting unit 34c notifies the clerk of the left money (step S105), and enters the left money retaining mode upon receiving an operation performed by the clerk (step S106).

The banknote handling unit 40 and the coin handling unit 50 receive deposited money (step S107), and the left money retaining unit 34d specifies the total amount of the deposited money and the date and time of the deposit. Furthermore, the left money retaining unit 34d acquires additional information including: information specifying the customer; register No.; transaction content such as the amount of deposited money and change at settlement; receipt No.; and clerk ID identifying the clerk (step S108).

The left money retaining unit 34d registers, in the left money management data 33b, the total amount of the deposited money, the date and time of the deposit, and the additional information in association with each other (step S109). Thereafter, the left money retaining unit 34d cancels the left money retaining mode in response to an operation performed by the clerk (step S110) to end the process.

Figure 7:
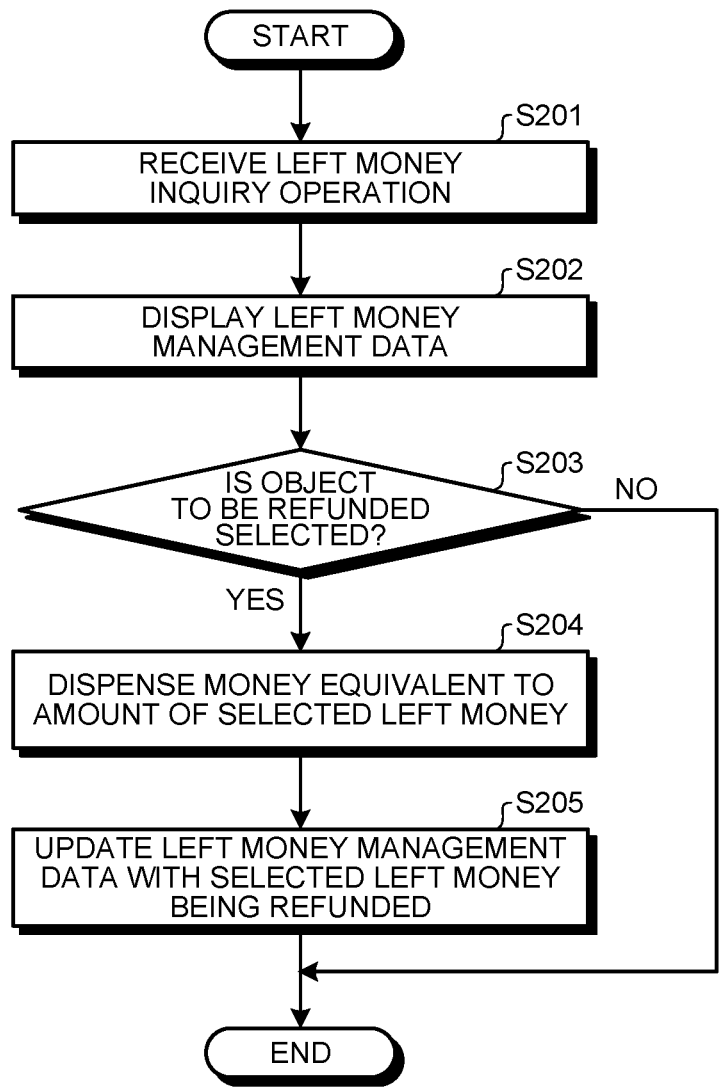
FIG. 7 is a flowchart showing a procedure of refunding left money.

FIG. 7 is a flowchart showing the procedure of refunding left money. Upon receiving a left money inquiry operation performed by the clerk (step S201), the left money retaining unit 34d controls the display unit (display/operation unit 32 or display/operation unit 21) to display the amount of money, the date and time, etc., registered in the left money management data 33b, in association with each other (step S202).

When an object (left money) to be refunded is selected (Yes in step S203), the left money retaining unit 34d dispenses money equivalent to the amount of the selected left money (step S204), and updates the left money management data 33b with the selected left money being refunded (step S205) to end the process. Also, when an object to be refunded is not selected (No in step S203), the process is ended.

Next, collection of money from the change machine 30, which is performed in a checkout ending work, will be described. The checkout ending work is a work to end checkout at the checkout counter and determine an inventory amount of money stored in the money handling unit of the change machine 30. In the checkout ending work, it may be confirmed that the determined inventory amount of money matches data managed in a POS system. FIG. 8 is a drawing for explaining collection of money from the change machine 30. As shown in FIG. 8, when there is no left money that has not been refunded, collection of money from the money handling unit (banknote handling unit 40 and coin handling unit 50) is any of "collect all money", "collect only proceeds", and "leave all money". In the case of "collect all money", all the money is collected from the change machine 30. In the case of "collect only proceeds", only the money corresponding to the proceeds from sales during store hours is collected while leaving money that has been present as change fund before the store was opened. In the case of "leave all money", all the money is not collected but is left in the change machine 30.

Meanwhile, when there is left money that has not been refunded, collection of money from the money handling unit is any of "collect all money", "collect only proceeds", "leave all money", "collect only left money", and "sequentially collect proceeds and left money having not been refunded". In the case of "collect all money", all the money is collected from the change machine 30. In the case of "collect only proceeds", only the money corresponding to the proceeds from sales is collected while leaving change fund, and change money that has been deposited as left money and has not been refunded yet. In the case of "collect only left money", only the change money that has been deposited as left money and has not been refunded yet, is collected. In the case of "sequentially collect proceeds and left money having not been refunded", the proceeds from sales, and the change money that has been deposited as left money and has not been refunded yet, are sequentially collected. In the case of "leave all money", all the money is not collected but is left in the change machine 30.

Next, a specific example of display output by the checkout apparatus 10 will be described. The checkout apparatus 10 performs display output by using the display/operation unit 32 and the display/operation unit 21. FIGS. 9A to 9D illustrate a specific example of display output performed when coins are left behind.

First, when left coins are detected, the checkout apparatus 10 controls the display/operation unit 21 to display a message such as "Coins have been left behind. Please check the outlet." as shown in FIG. 9A.

Thereafter, when the checkout apparatus 10 enters the left money retaining mode upon receiving an operation performed by the clerk, the checkout apparatus 10 controls the display/operation unit 21 to display a message such as "Please check the amount of left money, and deposit the left money in the inlet." as shown in FIG. 9B.

Upon receiving the deposited money, the checkout apparatus 10 controls the display/operation unit 21 to display a message such as "Please check the amount of money and press OK if the amount is correct." as shown in FIG. 9C.

FIG. 9D shows display output for checking the amount of money, etc., as follows.

"Date and time: 2018/09/26, 09:10

Amount: 689 JPY

Register No.: 13

Transaction content: deposited amount 2,000 JPY, change 689 JPY

Receipt No. 123456"

FIGS. 10A to 10C illustrate a specific example of display output related to a refund of left money. Upon receiving a left money inquiry operation performed by the clerk, the checkout apparatus 10 controls the display/operation unit 21 to perform display based on the left money management data 33b as shown in FIG. 10A. FIG. 10A shows the content of the display as follows.

"Please select an item you want to examine.

1. 2018/09/25, 14:16, 124 JPY (refunded)

2. 2018/09/26, 09:10, 689 JPY 3. 2018/09/26, 13:42, 435 JPY"

When any of the items shown in FIG. 10A is selected, the checkout apparatus 10 controls the display/operation unit 21 to display details of the selected item as shown in FIG. 10B. FIG. 10B shows the content of the display as follows.

"Please press OK if the examined content has no problems.

Recorded information

Date and time: 2018/09/26, 09:10

Amount: 689 JPY

Register No.: 13

Transaction content: deposited amount 2,000 JPY, change 689 JPY"

Upon receiving an operation to determine a refund, the checkout apparatus 10 dispenses money corresponding to the amount, and controls the display/operation unit 21 to display a confirmation screen shown in FIG. 10C. FIG. 10C shows a message such as "689 JPY will be dispensed. Please refund the money to the customer."

Next, handling performed when an error occurs will be described. When an error occurs in the checkout apparatus 10, a screen that emphasizes an error resetting method (error reset guidance) is displayed, and furthermore, a screen that urges an operator to pay attention to an operation or a medium that has caused the error (error reduction operation guidance) is displayed. Thus, the operator is encouraged to learn about the operation.

Examples of errors caused by user operation include: failure in feeding (abnormal deposit); failure in setting a cassette or the like; and jamming near an inlet (abnormal medium/abnormal deposit). These errors can be reduced when the user (operator) learns the operation.

The error reduction operation guidance may not be displayed each time an error is caused by user operation, but may be displayed when a predetermined warning condition is satisfied. A warning condition that indicates timing to call attention can be set by using, for example, operation hours (a week), occurrence frequency (number of times a day), handling content (20 or more banknotes/coins transported per handling), and previous handling (immediately after error resetting). In addition, a warning condition may be set so as to display the error reduction operation guidance each time an error is caused by only an operation performed by the operator, or a particularly serious error occurs.

FIG. 11 is a flowchart showing the procedure of handling when an error occurs. First, when the checkout apparatus 10 detects occurrence of an error (step S301), the checkout apparatus 10 determines whether or not a user operation is one of the causes of the error (step S302). When the user operation is one of the causes (Yes in step S302), the checkout apparatus 10 determines whether or not a warning condition is satisfied (step S303).

When the user operation is not included in the causes (No in step S302) or when the warning condition is not satisfied (No in step S303), the checkout apparatus 10 displays an error reset guidance on the display/operation unit 21 (step S305) to end the process.

Meanwhile, when the warning condition is satisfied (Yes in step S303), the checkout apparatus 10 displays the error reduction guidance on the display/operation unit 21 (step S304), and thereafter displays an error reset guidance on the display/operation unit 21 (step S305) to end the process.

As described above, according to the present embodiment, the checkout apparatus 10 having the function of the money handling apparatus can be set in the left money retaining mode. Upon receiving money deposited in the left money retaining mode, the checkout apparatus stores, in the memory, the amount of the money, the date and time of the reception, etc., to manage the left money. Thus, efficiency in handling the left money is improved.

According to the present embodiment, the checkout apparatus 10 can store the amount of money received during the left money retaining mode and the date and time of the reception, and the amount of money received during a time period other than during the left money retaining mode and the date and time of the reception, separately in the memory so as to be distinguishable from each other.

According to the present embodiment, the checkout apparatus 10 is set in the left money retaining mode when detecting that the dispensed money remains therein after a predetermined time has passed.

According to the present embodiment, the checkout apparatus 10 can display the amount of money and the date and time, which are stored in the memory, on the display in association with each other.

According to the present embodiment, when the checkout apparatus 10 detects that the dispensed money remains therein after a predetermined time has passed, the checkout apparatus 10 can notify a clerk who is a store staff member of this fact.

According to the present embodiment, the checkout apparatus 10 reads information specifying a customer as a purchaser, and stores this information, the amount of dispensed money, and the date and time of the dispensing in association with each other. When the amount of the dispensed money matches the amount of money received during the left money retaining mode, it is possible to store that the amount of the received money should be refunded to the purchaser corresponding to the customer specifying information.

According to the present embodiment, the checkout apparatus 10 is an apparatus for self-checkout that allows a customer as a purchaser to deposit money. When the amount of money deposited by the customer exceeds the amount of purchase, the checkout apparatus 10 dispenses money corresponding to the amount of change, which can be taken out by the customer.

According to the present embodiment, when performing a process related to the amount of purchase, the checkout apparatus 10 can exclude, from the objects of the process, the amount of money received during the left money retaining mode.

According to the present embodiment, the checkout apparatus 10 controls the dispensing unit to perform a refund of the amount of money received during the left money retaining mode, based on an operation of an operator having predetermined authority, and stores information indicating whether or not a refund has been made for the money received during the left money retaining mode.

In the present embodiment, banknotes that are left behind are also deposited by the clerk in the left money retaining mode. However, the left banknotes may be automatically retracted into the apparatus. Even when the left banknotes are automatically retracted, the retracted banknotes are managed as left money and are excluded from the objects of sales management.

In the present embodiment, a refund of left money is performed by the checkout apparatus 10 in which the money has been left behind. However, the left money management data 33b may be shared with another apparatus to allow a refund from this apparatus. That is, an apparatus in which left money is deposited may be different from an apparatus that performs a refund of the left money to the customer. In this case, the left money management data 33b may be held in a host apparatus and shared with these apparatuses.

In the present embodiment, a refund is performed via a clerk. However, as long as a person who has forgotten to take change can be determined to be identical to a person who requests a refund, the refund may be performed without the clerk. For example, with membership information of a customer being associated with the amount of left money as customer specifying information, if membership information of a person who requests a refund matches the membership information associated with the amount of left memory, the refund is allowed without the clerk.

A dishonest act of a clerk can be avoided by giving an alarm when left money has been detected but has not been deposited.

In the present embodiment, the condition for detecting left money is that "a predetermined time has passed with dispensed money being left behind". However, a human detection sensor for detecting presence/absence of an operator may be provided, and detection of left money may be performed based on a condition that "the human detection sensor detects absence of an operator while dispensed money is being left behind". Thus, any condition may be adopted.

In the present embodiment, the checkout apparatus for self-checkout in which a customer performs registration and checkout for commodities by him/herself, has been described. However, the present invention may be applied to semi-self-checkout in which a clerk registers commodities by using a registration apparatus, and a customer performs checkout by using a checkout apparatus.

In the present embodiment, the present invention is applied to a money handling system in a convenience store, a supermarket, etc. However, the present invention may be applied to any money handling system such as a ticket machine.

The constituent elements described in the above embodiment are conceptually functional constituent elements, and thus may not be necessarily configured as physical constituent elements, as illustrated in the drawings. That is, distributed or integrated forms of each device are not limited to the forms illustrated in the drawings, and all or some of the forms may be distributed or integrated functionally or physically in any unit depending on various loads, use statuses, or the like.

The money handling apparatus, the money handling system, and the money handling method according to the present invention are useful in enhancing efficiency of handling money left behind in the money handling apparatus.

What is claimed is:

1. A money handling apparatus which is configured to operate in an operation mode selected from either a settlement mode or a left cash retaining mode, and is used for self-checkout in which, when the money handling apparatus operates in the settlement mode selected as the operation mode, a customer settles in cash for a total price of commodities which the customer purchases, the money handling apparatus comprising:

an inlet for depositing cash by the customer, the inlet through which the cash to be deposited is fed into the money handling apparatus;

an outlet for dispensing, as change, cash of which an amount is difference between an amount of the deposited cash and the total price of the commodity being purchased by the customer, the outlet through which the change is fed out from the money handling apparatus and from which the customer is capable of taking out the change;

a detector provided at the outlet and configured to detect that the change remains at the outlet as left cash which the customer does not take out from the outlet when the change is fed out through the outlet;

a memory configured to store left money management data;

a controller configured to control the money handling apparatus such that, when the detector detects the change remaining at the outlet as the left cash, the operation mode is shifted from the settlement mode to the left cash retaining mode in which a clerk deposits the left cash into the money handling apparatus to store therein the left cash, and when the money handling apparatus operates in the left cash retaining mode, the controller stores, in the memory, the left money management data including information on an amount of the left cash deposited by the clerk through the inlet, and information on the date and time when the left cash is deposited by the clerk through the inlet, the information on the amount of the left cash being associated with the information on the date and the time.

2. The money handling apparatus according to claim 1, wherein the controller stores, in the memory, the information on the amount of the left cash deposited by the clerk during the left cash retaining mode, and the information on the date and the time when the left cash is deposited by the clerk so as to be distinguishable from the amount of the cash deposited by the customer into the money handling apparatus in the settlement mode and time when the cash is deposited by the customer into the money handling apparatus operating in the settlement mode.

3. The money handling apparatus according to claim 1, wherein
the detector is configured to detects that the change remains at the outlet as the left cash when a predetermined time has passed after the change has been fed through the outlet, and
the controller shifts the operation mode of the money handling apparatus from the settlement mode to the left cash retaining mode when the detector detects the left cash remains at the outlet.

4. The money handling apparatus according to claim 1 further comprising a display
configured to display the information on the amount of the left cash and the information on the date and the time stored in the memory, in association with each other.

5. The money handling apparatus according to claim 3 further comprising a notification unit,
configured, when the detector detects the left cash, to notify the clerk of the left cash remaining at the outlet.

6. The money handling apparatus according to claim 3 further comprising an information reading unit,
configured to read customer specifying information that specifies the customer purchasing the commodities,
the memory stores the customer specifying information, the amount of the change, and the date and the time when the change is dispensed, in association with each other, and
when the amount of the change fed out from the money handling apparatus matches the amount of the left cash deposited by the clerk, the memory stores information indicating that the amount of the left cash deposited by the clerk is to be refunded to the customer corresponding to the customer specifying information.

7. The money handling apparatus according to claim 1, wherein
while the money handling apparatus operates in the settlement mode, when the amount of the cash deposited by the customer exceeds the total price of commodities which the customer purchases, the cash of which the amount is the difference is dispensed through the outlet as the change which the customer is allowed to take out from the outlet.

8. The money handling apparatus according to claim 1, wherein
the controller is configured to control the money handling apparatus to perform a refund by dispensing cash equivalent to the amount of the left cash deposited by the clerk in the left cash retaining mode.

9. The money handling apparatus according to claim 3, further comprising:
a mode setting unit configured to determine whether or not the change remains at the outlet, based on a detection result of the detector, wherein
when the change remains at the outlet, the mode setting unit is configured to determine whether or not the predetermined time has passed after the change has been fed out through the outlet.

10. The money handling apparatus according to claim 9, wherein
when the setting unit determines that the predetermined time has passed, the controller is configured to control the money handling apparatus such that the operation mode of the money handling apparatus shifts from the settlement mode to the left cash remaining mode.

11. The money handling apparatus according to claim 9, wherein the cash includes banknotes and/or coins.

* * * * *